Jan. 25, 1955     J. F. YOUNG     2,700,395
MAGNETIC ADJUSTING AND STABILIZING MEANS
FOR WEIGHT DIFFERENTIAL VALVES
Filed Dec. 29, 1951
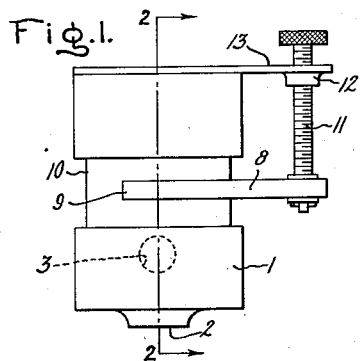
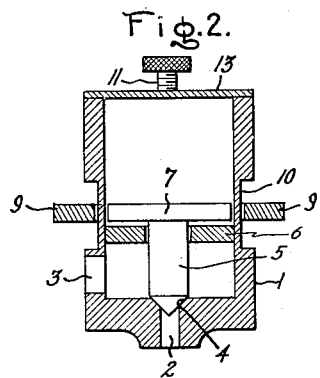
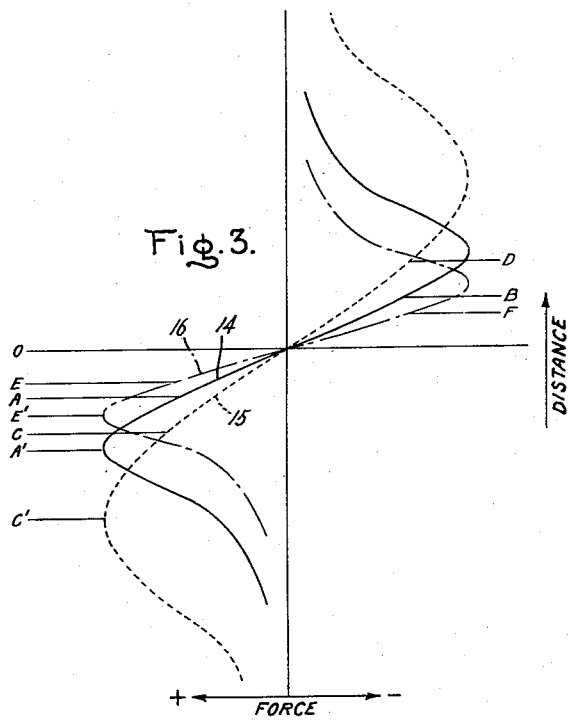
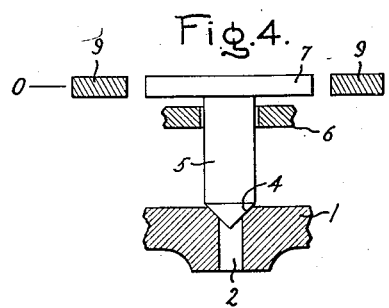
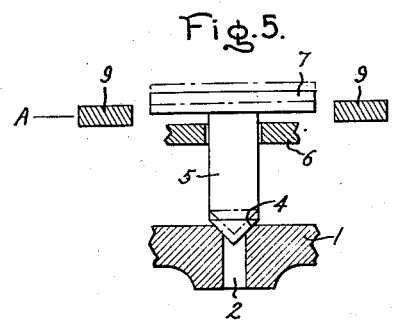
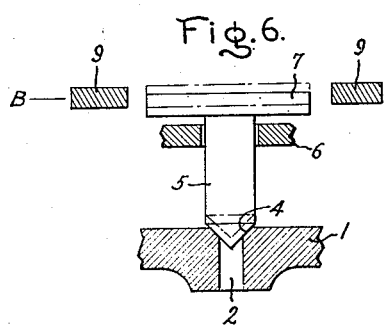
Inventor:
James F. Young,
by *Sheridan & Ross*
His Attorney.

United States Patent Office 2,700,395
Patented Jan. 25, 1955

2,700,395

MAGNETIC ADJUSTING AND STABILIZING MEANS FOR WEIGHT DIFFERENTIAL VALVES

James F. Young, Erie, Pa., assignor to General Electric Company, a corporation of New York Application December 29, 1951, Serial No. 264,173

7 Claims. (Cl. 137—523)

My invention relates to valves and pertains more particularly to pressure differential valves.

One type of pressure differential valve includes a valve seat, a valve pin arranged to act on the valve seat and means for biasing the pin toward the seat. The pressure differential between the high and low pressure sides of the valve is determined by the pin force or the force with which the biasing means urges the pin toward the valve seat. However, due to manufacturing variations, it is difficult to provide a valve of this type effective for maintaining accurately a desired pressure differential; also the valve instabilities inherent in this type of valve heretofore have precluded its employment in apparatus wherein it is essential to maintain substantially constant pressure differentials. Additionally, it is desirable to provide in this type of valve means for varying the pin force in order that the valve might be employed effectively in apparatus, such as refrigerating systems, wherein it is desirable to increase or decrease adjustably the pressure differential between components.

Accordingly, it is a primary object of my invention to provide in a pressure differential valve including a valve seat, a pin for acting on the valve seat and means whereby the pin is biased toward the valve seat for determining the pressure differential, improved means for altering the effect of the biasing means thereby to adjustably increase or decrease the pressure differential.

Another object of my invention is to provide in a valve including a valve seat, a valve pin and means whereby the pin is biased toward the valve seat for determining the pressure differential between the high and low pressure sides of the valve, an improved arrangement for stabilizing the actions of the valve whereby the pressure differential is maintained more nearly constant.

Still another object of my invention is to provide in a pressure differential valve including a valve seat, a valve pin for acting on the valve seat and biasing means cooperating with said pin for determining the pressure differential, magnetic adjusting means adapted both for altering the effect of the biasing means thereby to increase or decrease the pressure differential and for stabilizing the actions of the valve.

Further objects and advantages of my invention will become apparent as the following description proceeds and the features of novelty which characterize my invention will be pointed out with particularity in the claims annexed to and forming a part of this specification.

In carrying out the objects of my invention, I provide in a valve housing a valve seat, a valve pin and means whereby the pin is biased toward the valve seat with a predetermined pin force. A magnet attracts an armature connected to the valve pin and is adjustably positionable for increasing or decreasing the pin force. Also, lifting of the valve pin affects the attraction between the magnet and the armature in such a manner that the valve action is stabilized.

For a better understanding of my invention, reference may be had to the accompanying drawing in which Fig. 1 is a side elevational view of the device of my invention; Fig. 2 is a section taken along the line 2—2 in Fig. 1; Fig. 3 is a force-distance graph illustrating effects obtainable through various modifications of the magnet; Fig. 4 is a schematic illustration in which the magnet is shown in a neutral position; Fig. 5 is a schematic illustration in which the magnet is shown in a position for increasing the pin force; and Fig. 6 is a schematic illustration in which the magnet is shown in a position for decreasing the pin force.

As seen in Figs. 1 and 2, the device of my invention includes a vertical valve housing 1 formed of a non-magnetic material and having an inlet passage 2 and an outlet passage 3. Inside the housing 1 the inlet passage 2 is formed to provide a valve seat 4. Provided for acting on the valve seat 4 is a weighted valve pin 5. The valve pin 5 is guided by passing slidingly through a passage provided in a bar 6 which is also formed of a non-magnetic material and is suitably secured in the housing 1. The weight of the valve pin 5 is selected for causing it to be biased toward the valve seat 4 with a predetermined pin force thereby to determine the pressure differential between the inlet passage 2 and the outlet passage 3, or the high and low pressure sides of the valve. It will be seen that while I employ a weighted valve pin, other means such as a spring could be effectively utilized for biasing the pin toward the valve seat with a predetermined force.

Connected to the upper end or the head of the valve pin 5 is an armature 7. Provided for cooperating with the armature 7 and located outside the housing 1 is a horseshoe magnet 8. The poles 9 of the horseshoe magnet 8 straddle the housing 1 and are disposed in a peripheral groove 10 formed in the housing. When the valve pin 5 is seated, the armature 7 is located in a plane midway between the planes of the side edges of the groove 10. An adjusting screw 11 is threaded in a stationary nut 12 formed in an extension bracket 13 secured to the top of the housing 1. The lower end of the adjusting screw 11 is loosely connected to the magnet 8, and by turning the adjusting screw it is possible to adjust the vertical position of the magnet between the lower and upper side edges of the groove 10.

In Fig. 3, 14 indicates the force-distance curve of the magnet 8. The vertical distance between A and B on the curve 14 corresponds to the adjustment distance of the magnet 8, or the width of groove 10 in the housing 1. When the magnet 8 is adjustably positioned to engage the lower side edge of the groove 10, it is in a position corresponding to A on the curve 14. When the magnet 8 is adjustably positioned to engage the upper side edge of the groove 10, it is in a position corresponding to B on the curve 14. The vertical distance between A and A′ on the curve 14 corresponds to a typical lift of the valve pin 5. O on the curve is midway between A and B and indicates the neutral position of the magnet 8, and it is in its neutral position that the magnet is seen in Figs. 2 and 4. When the magnet 8 is positioned neutrally, it is in substantially the same plane as the armature 7 when the pin is seated and it neither attracts the armature 7 downwardly for increasing the pin force nor upwardly for decreasing the pin force. The pressure differential is therefore determined entirely by the weight of the valve pin 5. However, lifting of the pin 5 causes a downward attraction whereby the valve action is stabilized when the magnet is neutrally positioned.

If it is desired to increase the pressure differential between the low and high pressure sides of the valve, the magnet 8 is moved, by turning the adjusting screw 11, toward the A position which, as seen in Fig. 5, is between the plane of the armature 7 when the valve pin 5 is seated and the valve seat 4. Between the O and A positions, the magnet 8 attracts the armature 7 downwardly to increase the pin force and thereby increase the pressure differential. As seen in Fig. 3, position A is located intermediate the neutral point O and a point of maximum attraction which is located at the peak of the curve 14, or at A′. Also, as pointed out above, the lift of the valve pin 5 corresponds to the vertical distance between A and A′. Therefore, when the magnet 8 is in an adjusted position between points O and A, lifting of the valve pin 5 to the position indicated by dot and dash lines in Fig. 5 results in an increase in the downward attraction between the poles 9 of the magnet 8 and the armature 7. This increase in downward attraction causes an increase in pin force during lifting of the valve pin 5 which is effective for stabilizing the action of the valve.

When it is desired to decrease the pressure differential below that determined by the weight of the valve pin 5, the magnet 8 is moved, by turning the adjusting screw 11, toward position B which, as seen in Fig. 6, is above the plane of the armature 7 when the pin 5 is seated, or on the side of the armature opposite the valve seat 4. Between the O and B positions, the magnet 8 attracts the armature 7 upwardly to decrease the pin force and thereby decrease the pressure differential. Position B is also located between points of minimum and maximum upward attraction on the force-distance curve 14 in Fig. 3. Therefore, during lifting of the valve pin 5 to the position shown in dot and dash lines in Fig. 6, the attraction between the magnet 8 and the armature 7 decreases toward the point O on the curve 14. This also has a stabilizing effect on the valve action.

It will be seen that the magnet to be employed in this arrangement depends upon the lift of the valve pin 5 and the range of adjustment desired for the device. For instance, if the valve lift were greater than that in the just described arrangement, in order to provide the same adjustment range, it would be necessary to employ a wider magnet. This will be better understood by referring to Fig. 3 wherein 15 is the force-distance curve of the wider magnet. On this curve, the vertical distance between C and C' corresponds to the greater valve lift. Therefore, in order to obtain the same adjustment range as that provided by the magnet represented by the curve 14, the adjustment distance of the wider magnet would have to correspond to the vertical distance between C and D on the curve 15.

In Fig. 3, 16 is the force-distance curve of a magnet narrower than the magnet represented by the curve 14. The narrower magnet may be employed when the valve lift is smaller than that in the first-described arrangement. On the curve 16, the vertical distance between E and E' corresponds to the smaller valve lift. The vertical distance between E and F corresponds to the adjustment distance required for the narrower magnet to obtain the same adjustment range as the wider and still wider magnets represented by curves 14 and 15, respectively.

It will be seen that with my invention, it is possible to adjust accurately the force with which the valve pin 5 acts on the valve seat 4. Thus, manufacturing variations in the valve may be compensated for and the valve may be adjusted for maintaining various desired pressure differentials. Also, the pressure differential is maintained more nearly constant by the valve stability afforded in my construction.

While I have shown and described specific embodiments of my invention, I do not desire my invention to be limited to the particular construction shown and described and I intend by the appended claims to cover all modifications within the spirit and scope of my invention.

What I claim as new and desire to secure by Letters Patent of the United States is:

1. A pressure differential valve comprising a valve seat, a valve pin coacting with said valve seat, biasing means biasing said valve pin towards said valve seat with a predetermined pin force to determine the pressure differential between the high and low pressure sides of said valve, an armature connected to said valve pin, magnetic means adjustably positionable relative to said armature for attracting said armature toward said valve seat and thereby increasing said pin force whereby said pressure differential is increased, and means limiting the adjustable positioning of said magnetic means at the mid point of maximum attraction for said armature, the lifting of said pin increasing the attraction between said armature and said magnetic means when said magnetic means is in an adjusted position thereby to stabilize the valve action.

2. A pressure differential valve comprising a valve seat, a weighted valve pin coacting with said valve seat with a predetermined pin force thereby to determine the pressure differential between the high and low pressure sides of said valve, said weighted valve pin including an armature, a magnet adjustably positionable relative to said armature for attracting said armature toward said valve seat and thereby increasing said pin force whereby said pressure differential is increased, and means limiting the adjustable positioning of said magnet at the mid point of maximum attraction for said armature whereby lifting of said valve pin increases the attraction between said magnet and said armature thereby to stabilize the action of said valve.

3. A pressure differential valve comprising a valve seat, a valve pin coacting with said valve seat, means biasing said valve pin toward said valve seat with a predetermined pin force to determine the pressure differential between the high and low pressure sides of said valve, an armature connected to said valve pin, magnetic means adjustably positionable relative to said armature for attracting said armature away from said valve seat and thereby decreasing said pin force whereby said pressure differential is decreased, and means limiting the adjustable positioning of said magnetic means at the mid position between points of minimum and maximum attraction for said armature, the lifting of said pin decreasing the attraction between said armature and said magnetic means when said magnetic means is in an adjusted position thereby to stabilize valve action.

4. A pressure differential valve comprising a valve seat, a weighted valve pin coacting with said valve seat with a predetermined pin force thereby to determine the pressure differential between the high and low pressure sides of said valve, said weighted valve pin including an armature, a magnet adjustably positionable relative to said armature for attracting said armature away from said valve seat and thereby decreasing said pin force whereby said pressure differential is decreased, and means limiting the adjustable positioning of said magnet at the mid position between points of minimum and maximum attraction for said armature whereby lifting of said valve pin decreases the attraction between said magnet and said armature thereby to stabilize the action of said valve.

5. A pressure differential valve comprising a valve seat, a valve pin coacting with said valve seat, means biasing said valve pin toward said valve seat with a predetermined pin force to determine the pressure differential between the high and low pressure sides of said valve, an armature connected to said valve pin, and magnetic means movable to either of two positions relative to said armature, said magnetic means being effective when in one position for attracting said armature toward said valve seat and thereby increasing said pin force whereby said pressure differential is increased, said magnetic means being limited in movement when in said one position at the mid point of maximum attraction for said armature, said magnetic means being effective when in the other position for attracting said armature away from said valve seat and thereby decreasing said pin force whereby said pressure differential is decreased, said magnetic means being limited in movement when in said other position at a position midway between points of minimum and maximum attraction for said armature, lifting of said valve pin being effective for increasing the attraction between said armature and magnetic means when said magnetic means is in said one position and for decreasing the attraction between said armature and magnetic means when said magnetic means is in the other position whereby valve action is stabilized.

6. A pressure differential valve comprising a valve seat, a weighted valve pin coacting with said valve seat with a predetermined pin force thereby to determine the pressure differential between the high and low pressure sides of said valve, said weighted valve pin including an armature, a magnet adjustable to either of two positions relative to said armature, said magnet being effective when in one position for attracting said armature toward said valve seat and thereby increasing the pin force whereby said pressure differential is increased, said magnet being limited in adjustment when in said one position at the mid point of maximum attraction for said armature, said magnet being effective when in the other position for attracting said armature away from said valve seat and thereby decreasing the pin force whereby said pressure differential is decreased, said magnet being limited in adjustment when in said other position in a position midway between points of minimum and maximum attraction for said armature, and lifting of said valve pin being effective for increasing the attraction between said armature and magnet when said magnet is in said one position and for decreasing the attraction between said armature and magnet when said magnet is in the other position whereby valve action is stabilized.

7. A pressure differential valve comprising a vertical housing having a peripheral groove, a valve seat whereby said housing is divided into low and high pressure sides, a weighted valve pin arranged for acting vertically on said valve seat with a predetermined pin force thereby to determine the pressure differential between said low and high pressure sides of said housing, said weighted valve pin including an armature, said armature being located in a plane intermediate the side edges of said peripheral groove when said valve pin is seated, a horseshoe magnet, the poles of said magnet being disposed in said groove, means for adjusting the vertical position of said magnet poles between said side edges of said peripheral groove, one side edge of said peripheral groove being effective for limiting the adjustment of said magnet poles to positions between the point of minimum and the mid point of maximum downward attraction for said armature to increase said pin force and said pressure differential, the other side edge of said peripheral groove being effective for limiting the adjustment of said magnet poles to positions between the point of minimum and the mid point of maximum upward attraction for said armature to decrease said pin force and said pressure differential, and said valve pin being effective during lifting thereof for increasing the downward attraction between said magnet poles and said armature when said poles are in an adjusted position between said plane intermediate the side edges of said peripheral groove and said one side edge thereof and for decreasing the upward attraction between said magnet poles and said armature when said poles are in an adjusted position between said plane intermediate the side edges of said peripheral groove and said other side edge thereof whereby valve action is stabilized.

References Cited in the file of this patent

UNITED STATES PATENTS

| | | |
|---|---|---|
| 152,444 | Westland | June 23, 1874 |
| 2,536,813 | Jones et al. | Jan. 2, 1951 |

FOREIGN PATENTS

| | | |
|---|---|---|
| 74,521 | Austria | Aug. 26, 1918 |